US012391387B2

(12) United States Patent
Martins et al.

(10) Patent No.: US 12,391,387 B2
(45) Date of Patent: Aug. 19, 2025

(54) AIRCRAFT SEAT SYSTEM

(71) Applicant: EMBRAER S.A., São José dos Campos—SP (BR)

(72) Inventors: Renato Dedding Martins, São José dos Campos—SP (BR); Alexandre David Campos Kasakewitch Souza, São José dos Campos—SP (BR); Moacir Morais De Andrade Lima, São José dos Campos—SP (BR)

(73) Assignee: EMBRAER S.A., Sao Jose Dos Campos—SP (BR)

( * ) Notice: Subject to any disclaimer, the term of this patent is extended or adjusted under 35 U.S.C. 154(b) by 216 days.

(21) Appl. No.: 18/307,398

(22) Filed: Apr. 26, 2023

(65) Prior Publication Data

US 2024/0359798 A1 Oct. 31, 2024

(51) Int. Cl.
*B64D 11/06* (2006.01)
*B60N 2/07* (2006.01)
*B60N 2/30* (2006.01)

(52) U.S. Cl.
CPC ........ *B64D 11/0648* (2014.12); *B60N 2/0742* (2013.01); *B60N 2/3052* (2013.01); *B64D 11/064* (2014.12)

(58) Field of Classification Search
CPC .. B60N 2/3052; B60N 2/7042; B60N 2/0742; B64D 11/0648
See application file for complete search history.

(56) References Cited

U.S. PATENT DOCUMENTS

| | | | |
|---|---|---|---|
| 5,083,727 A | 1/1992 | Pompei et al. | |
| 6,692,051 B1 * | 2/2004 | Cook | B60N 2/24 296/24.39 |
| 8,267,471 B2 * | 9/2012 | Reel | B60N 2/4228 297/216.13 |
| 11,577,838 B2 | 2/2023 | Reichel et al. | |
| 11,865,957 B1 * | 1/2024 | Nayak | B60N 2/809 |
| 2004/0232743 A1 * | 11/2004 | Fujita | B60N 2/7011 297/216.1 |
| 2015/0108820 A1 * | 4/2015 | Fujita | B60N 2/70 297/452.48 |
| 2019/0031049 A1 * | 1/2019 | Last | B64D 11/0639 |
| 2019/0308525 A1 * | 10/2019 | Riedel | B60N 2/02 |
| 2022/0340284 A1 * | 10/2022 | Koustubhan | B64D 11/0648 |

FOREIGN PATENT DOCUMENTS

| | | | | |
|---|---|---|---|---|
| CA | 2956232 A1 * | 9/2017 | | B60N 2/06 |
| CA | 2974256 A1 * | 2/2018 | | B60N 2/062 |
| CN | 117426635 A * | 1/2024 | | A47C 7/002 |
| EP | 1900566 A2 * | 3/2008 | | B60N 2/06 |
| EP | 3453620 A1 * | 3/2019 | | B60N 2/01575 |
| EP | 3517434 A1 * | 7/2019 | | B60N 2/143 |
| EP | 4079636 A1 * | 10/2022 | | B60N 2/02253 |
| GB | 2569303 A * | 6/2019 | | B60N 2/005 |

(Continued)

*Primary Examiner* — Timothy J Brindley
(74) *Attorney, Agent, or Firm* — Nixon & Vanderhye, P.C.

(57) ABSTRACT

Vehicle seat systems, especially seat systems for aircraft passengers are provided. In preferred forms, the aircraft seat systems according to the embodiments disclosed herein will include a seat base assembly, a seat tracking/swivel assembly fixed to the seat base assembly and a seat bucket fixed to the seat tracking/swivel assembly.

13 Claims, 7 Drawing Sheets

(56) References Cited

FOREIGN PATENT DOCUMENTS

| GB | 2590751 A | * | 7/2021 | ............. B60N 2/005 |
| GB | 2594016 A | * | 10/2021 | ............. B60N 2/005 |
| WO | WO-2019119124 A1 | * | 6/2019 | ........... B60N 2/0717 |
| WO | WO-2019119126 A1 | * | 6/2019 | ........... B60N 2/0717 |
| WO | 2019183488 A1 | | 9/2019 | |

* cited by examiner

AIRCRAFT SEAT SYSTEM

FIELD

The embodiments disclosed herein relate generally to vehicle seat systems, especially seat systems for aircraft passengers. In preferred forms, the aircraft seat systems according to the embodiments disclosed herein will include a seat base assembly, a seat tracking/swivel assembly fixed to the seat base assembly and a seat bucket fixed to the seat tracking/swivel assembly.

BACKGROUND

Each new aircraft seat platform has a completely new seat structure which creates maturity issues during entrance into service associated with the main adjustment parts and aesthetical issues due to low repeatable manufacturing processes. Each new seat platform therefore experiences a long development cycle.

Seat systems known in the automotive arts will typically include seat support structures that allow adjustments between different seat positions. For example, such a seat support structure may include a backrest that can be pivotally connected to a seat platform to allow inclination adjustment of the former relative to the latter.

An aircraft specialty seat system is disclosed by U.S. Pat. No. 11,577,838 (the entire contents of which is expressly incorporated hereinto by reference) whereby a seat adjustment arrangement is provided which includes cooperative bearing and guide elements which allow the seat support structure to be transferred into a sitting position, a comfort position or a lying position by displacement of the bearing element along the guide element.

An upholstery module is disclosed by WO 2019/183488 (the entire contents of which is expressly incorporated hereinto by reference) to be suitable for an aircraft seat which includes an upholstery part detachable coupled to a seat support shell which in turn is detachably mounted to a seat support structure of the vehicle seat. The upholstery module forms at least one of a backrest upholstery part and a seat pan upholstery part, the upholstery part including a number of comfort layers and functional elements.

While the proposals in the art may be sufficient for their stated purposes, there is a continual need for improvement. Therefore, it would be highly desirable if an aircraft seat system could be provided that was more reliable as compared to conventional aircraft seat systems. It is towards fulfilling such needs that the embodiments disclosed herein are directed.

SUMMARY

Broadly, the embodiments disclosed herein are directed toward aircraft seat systems include a seat base assembly, a seat tracking/swivel assembly fixed to the seat base assembly and a seat bucket fixed to the seat tracking/swivel assembly.

According to certain embodiments, the seat base assembly will comprise a pair of lateral support frames, forward and aft cross-support tubes interconnected to the lateral support frames. Forward and aft mounting brackets may be provided and are respectively fixed to the forward and aft cross-support tubes and being connected to the seat bucket frame. The seat base assembly may therefore comprise a pair of the aft cross-support tubes, and forward and aft pairs of laterally separated mounting brackets, wherein the forward pair of mounting brackets is fixed to the forward cross-support tube, and the aft pair of laterally separated mounting brackets is connected to each one of the pair of aft cross-support tubes. The forward and aft ends of each of the lateral support frames may include respective downwardly directed forward and aft mounting feet each adapted to being connected to an underlying seat track associated with a floor of an aircraft.

According to some embodiments, the seat tracking/swivel assembly may comprise a swivel base member adapted to being immovably fixed to the laterally spaced apart forward and aft mounting brackets of the seat base, and a central mounting member that includes a swivel connection block to interconnect the central mounting member to the swivel base member to allow rotational movement of the central mounting member about a substantially vertical axis relative to the immovably swivel base member. Forward and aft mounting members may be positioned forward and aft of the central mounting member. A laterally spaced apart pair of slide tubes are preferably slidably received within the central mounting member and connected at forward and aft ends thereof to the forward and aft mounting members.

The seat bucket frame may include a pair of spaced apart lateral side plates while the forward and aft mounting members of the seat tracking/swivel assembly carry respective transverse forward and aft mounting tubes having opposed terminal ends each of which includes a mounting plate that is fixed to a respective one of the lateral side plates of the seat bucket frame.

The aircraft seat system according to some embodiments may further comprise a seat back frame connected at a lower end thereof to a rear end of the seat bucket frame to allow for articulated movement of the seat back frame relative to the seat bucket frame between upright and reclined positions. The seat back frame may be in the form of an inverted U-shaped tubular frame member having a pair of separated legs and back support straps spanning a distance between and connected to the separated legs. An upper end of the seat back frame may include an integrated headrest frame. The seat back frame may optionally include detent positioning mechanisms which are cooperatively engaged with a pair of dependently oriented headrest posts of the headrest frame to allow positional upward and downward movement of the headrest frame relative to the upper end of the seat back frame.

Each of the seat bucket frame, the seat back frame and the head rest frame is preferably provided with a molded seat cushion, a molded back cushion and a molded headrest cushion, respectively. Aircraft for passenger transport may therefore include one or preferably a plurality of the seat systems according to the embodiments disclosed herein.

These and other aspects and advantages of the present invention will become clearer after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which.

DETAILED DESCRIPTION OF EMBODIMENTS

Figure 1:
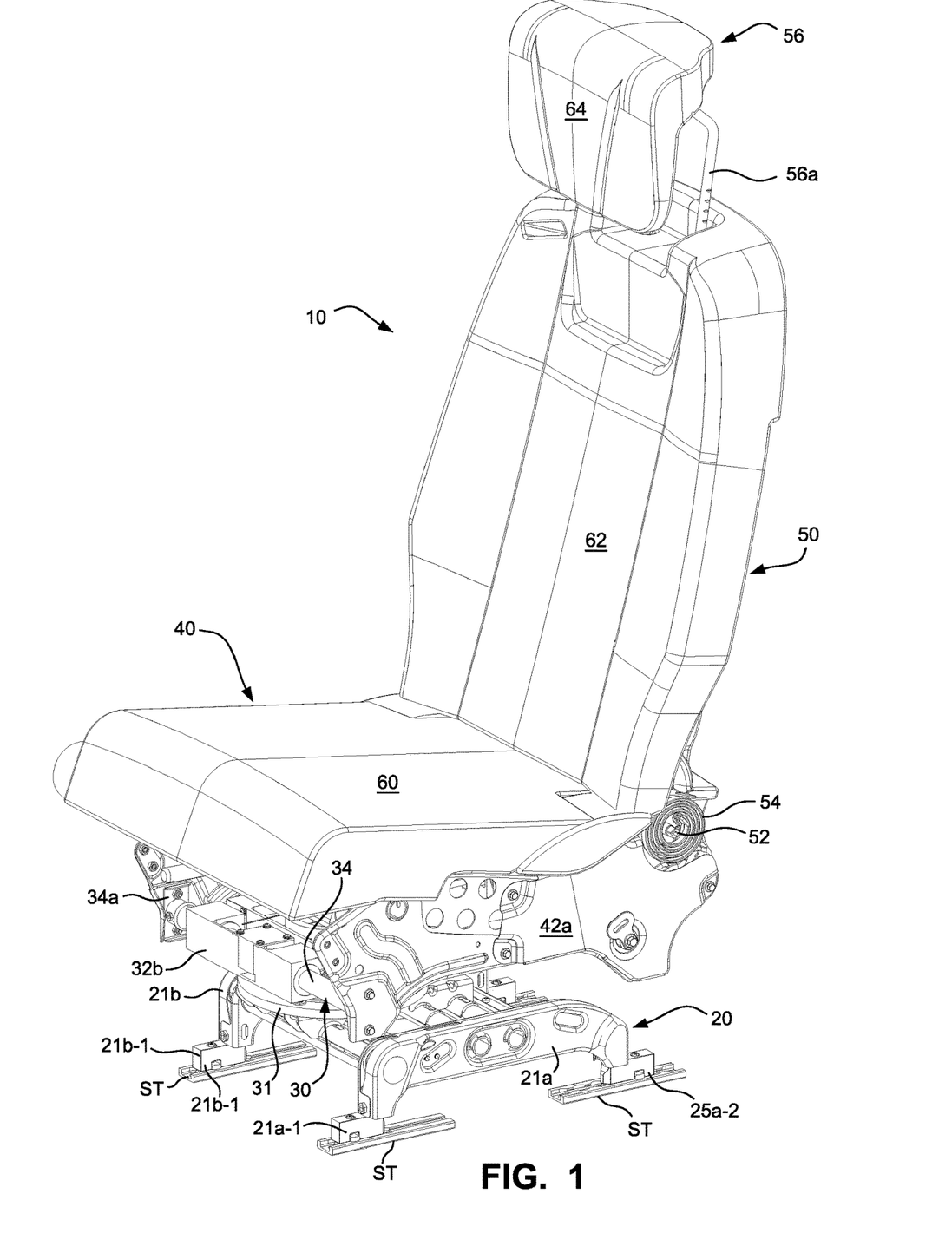
FIG. 1 is a perspective view of an aircraft seat system in accordance with an embodiment of the present invention.
Figure 2:
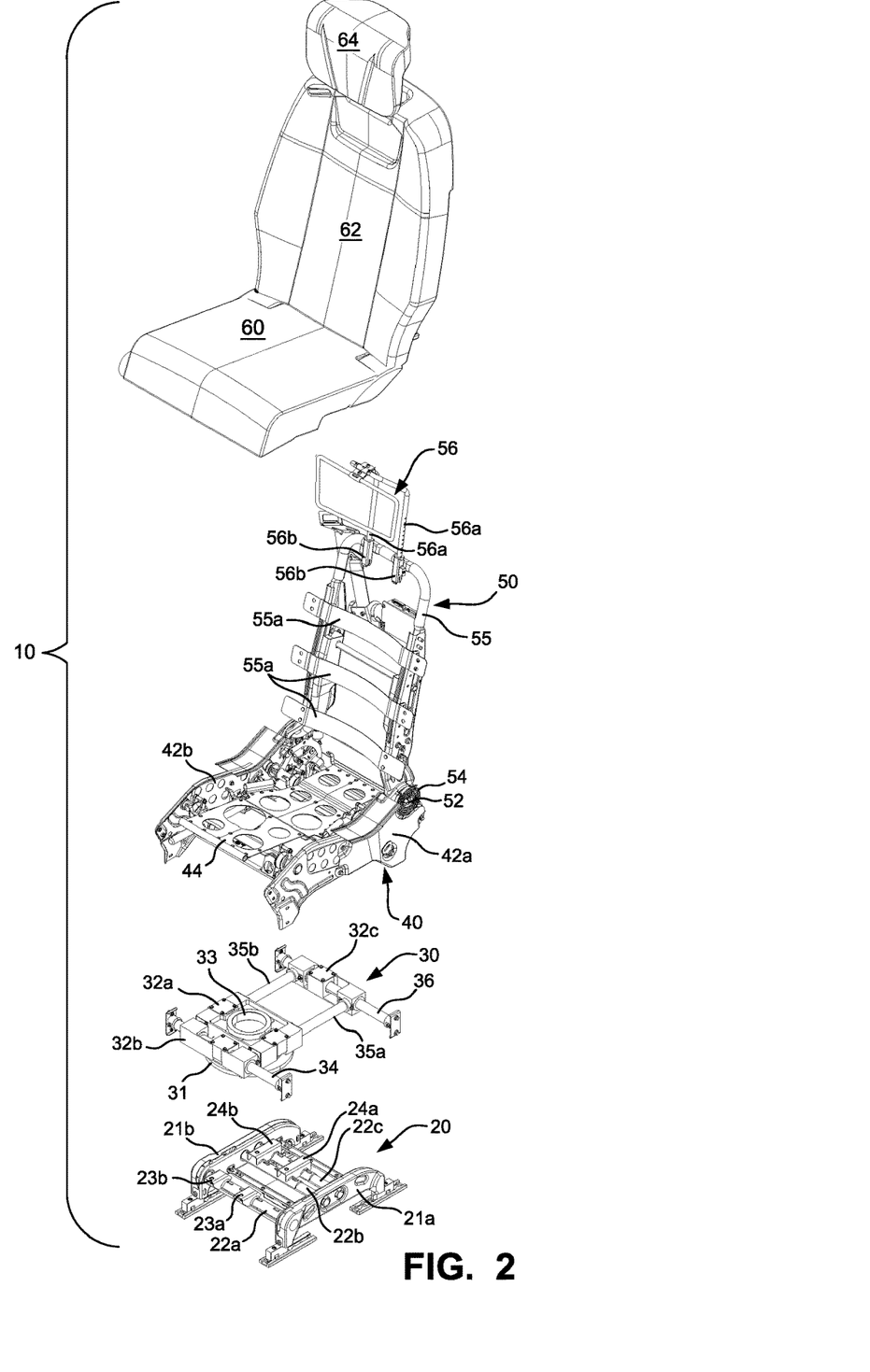
FIG. 2 is an exploded perspective view of the aircraft seat system shown in FIG. 1.
Figure 3:
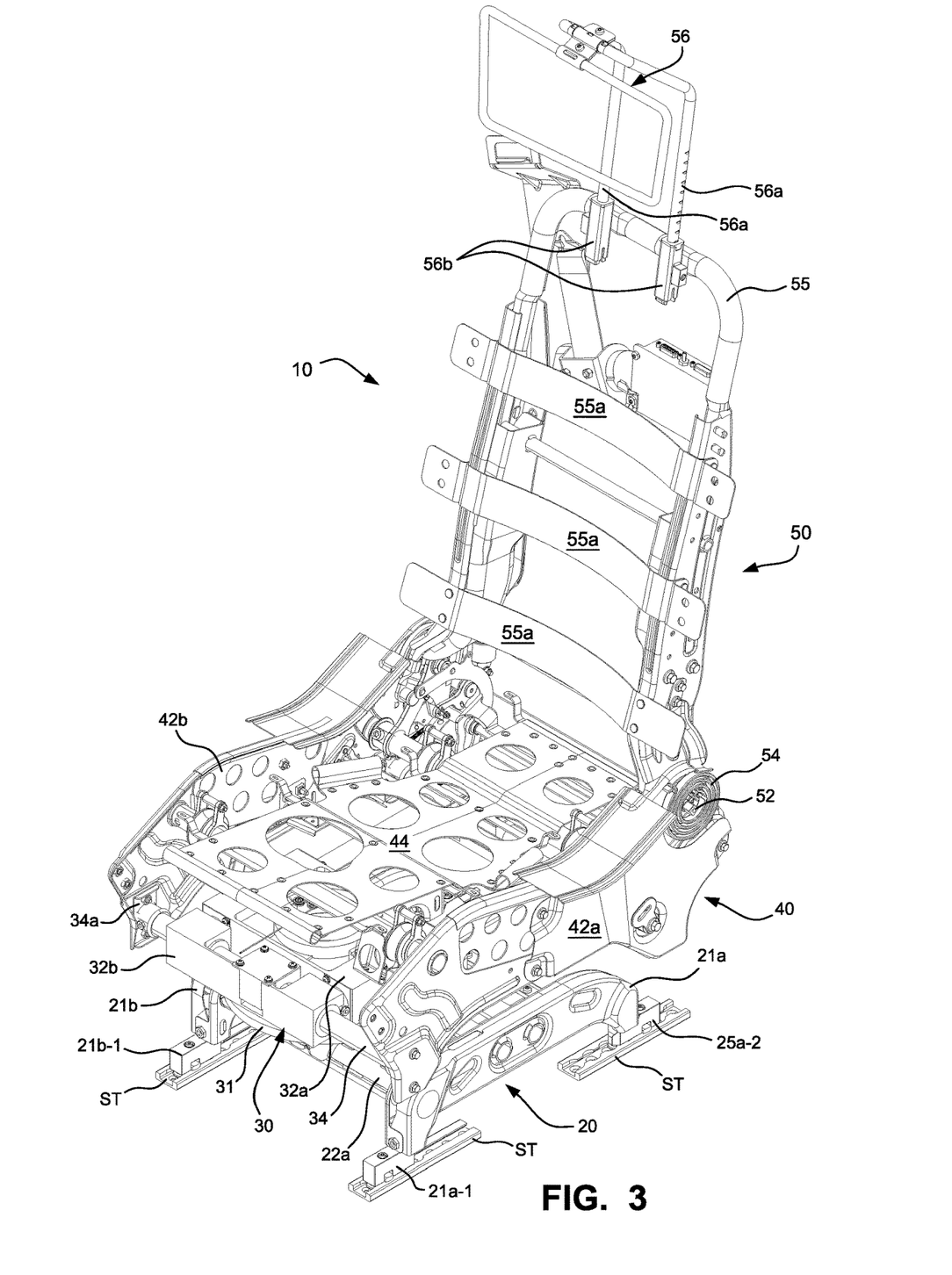
FIG. 3 is a perspective view of the aircraft seat system shown in FIG. 1 with the seat padding and upholstery removed.

Accompanying FIGS. 1-3 depict an aircraft seat system 10 in accordance with an embodiment of the present invention. As shown, the seat system 10 includes a seat base assembly 20, a seat tracking/swivel assembly 30 fixed to the seat base assembly 20, a seat bucket frame 40 fixed to the seat tracking/swivel assembly 30 and a seat back frame 50 fixed to the seat bucket frame 40 for articulated movements therebetween.

Figure 4:
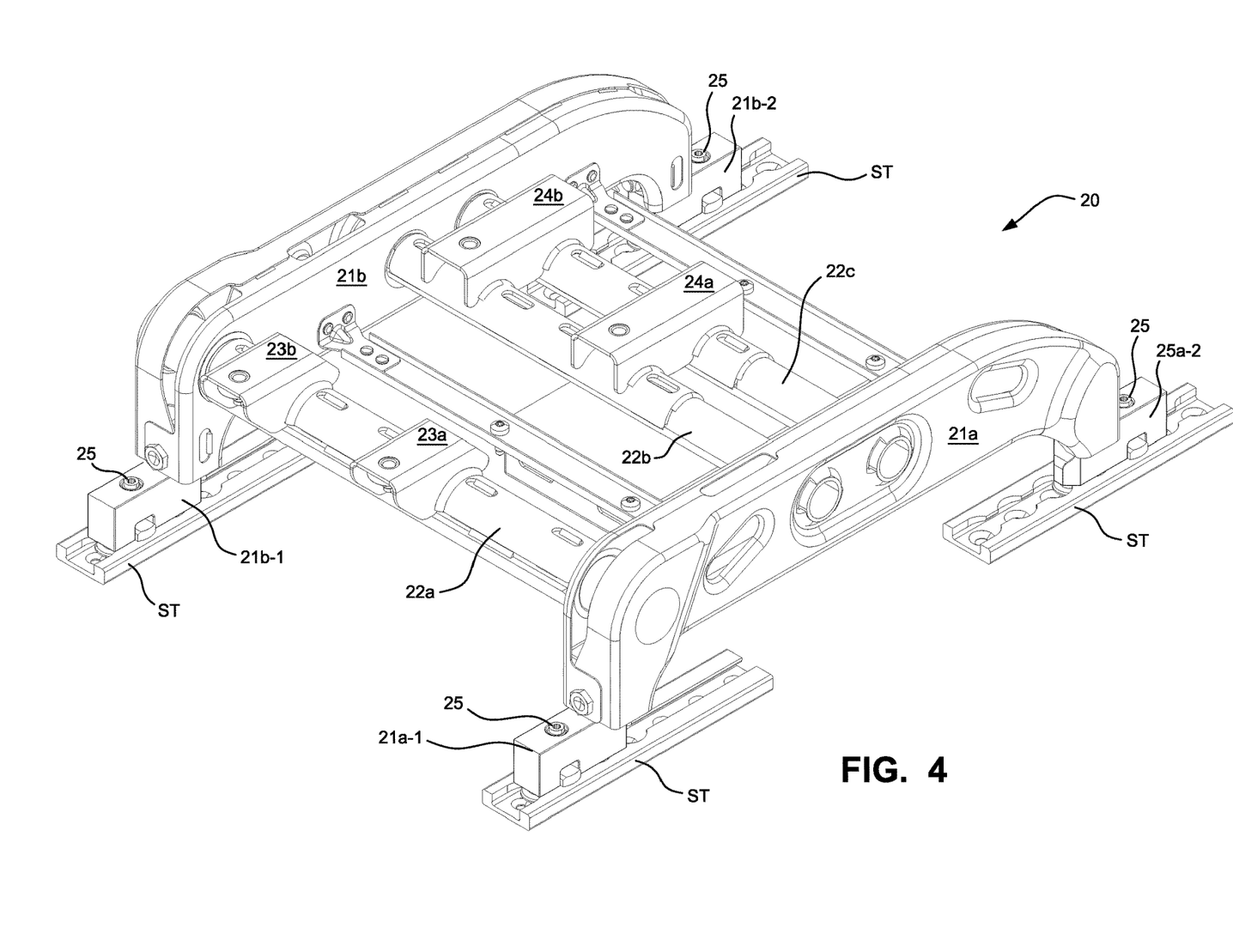
FIG. 4 is an enlarged perspective view of the seat base employed with the aircraft seat system according to FIG. 1.

The seat base assembly 20 is shown in an enlarged view in accompanying FIG. 4. As shown, the seat base assembly 20 includes a pair of lateral support frames 21a, 21b that are interconnected to one another by cross-support tubes 22a-22c. The cross-support tube 22a carries a pair of laterally spaced apart forward mounting brackets 23a, 23b while the cross support tubes 22b and 22c carry a pair of laterally spaced apart aft mounting brackets 24a, 24b which span the distance between and are therefore connected to the tubes 22b, 22c. Each forward and aft ends of the lateral support frames 21a, 21b are attached to downwardly directed forward and aft mounting feet 21a-1, 21a-2 and 21b-1, 21b-2, respectively. The forward and aft mounting feet 21a-1, 21a-2 and 21b-1, 21b-2 in turn carry seat bolts 25 that may be operatively secured to an underlying seat track ST fixed to the floor structure of an aircraft passenger cabin. The seat bolts 25 and seat tracks ST may be, for example, those as described in U.S. Pat. No. 5,083,727 (the entire content of which is expressly incorporated hereinto by reference).

Figure 5:
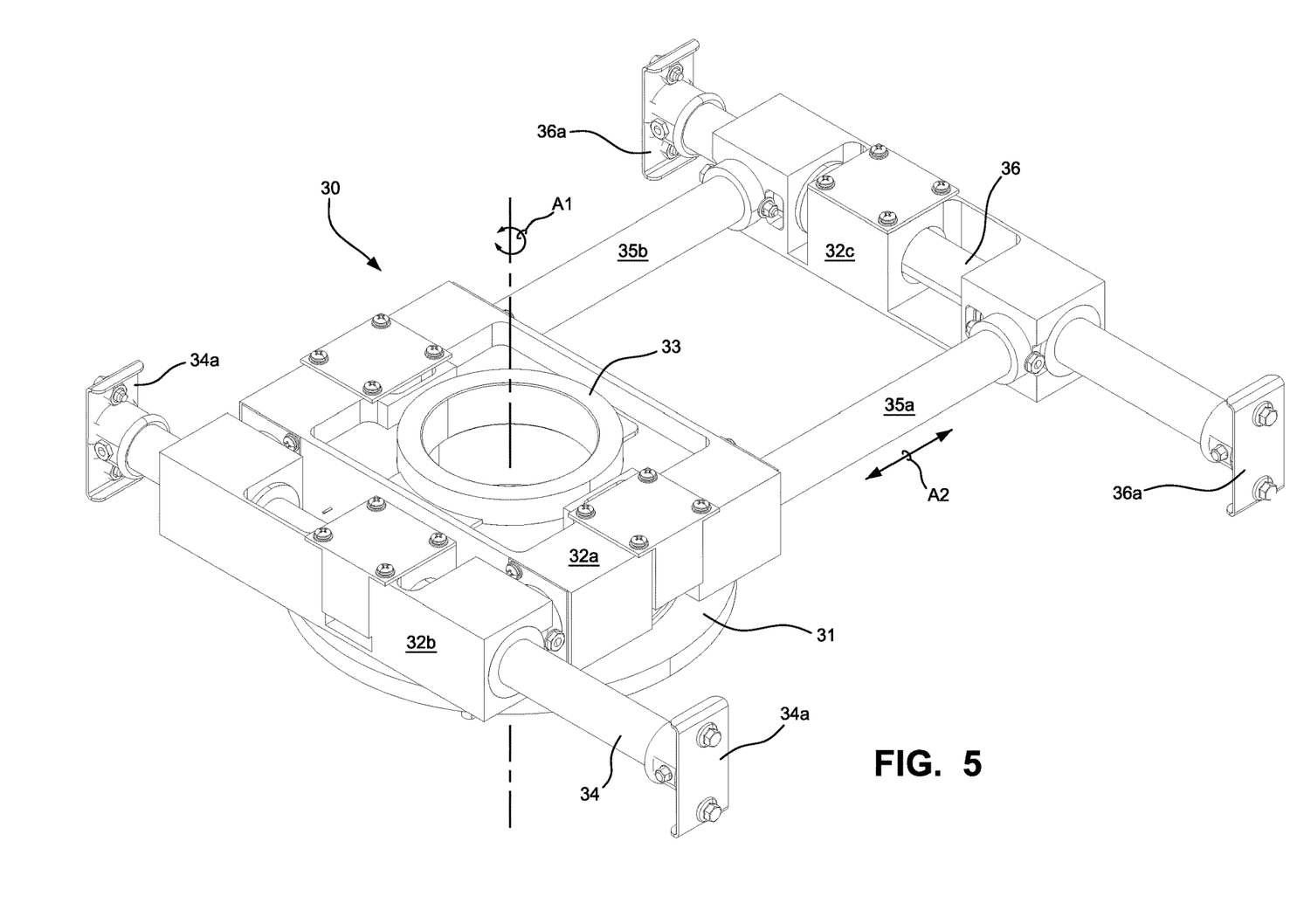
FIG. 5 is an enlarged view of the seat tracking/swivel assembly employed with the aircraft seat system according to FIG. 1.

An enlarged view of the seat tracking/swivel assembly (STSA) 30 is shown in accompanying FIG. 5. As shown, the STSA 30 includes a swivel base member 31 which is adapted to being immovably fixed to the laterally spaced apart forward and aft mounting brackets 23a, 23b and 24a, 24b, respectively, associated with the seat base assembly 20. The swivel base member 31 is also joined to a central mounting member 32a by a swivel connection block 33 to allow rotational movement of the central mounting member 32a about a substantially vertical axis (arrow A1 in FIG. 5) relative to the fixed-position swivel base member 31.

A forward mounting member 32b is positioned forwardly of the central mounting member 32a and carries a transverse forward support tube 34 which includes respective forward mounting plates 34a at each terminal end thereof. A laterally spaced apart pair of slide tubes 35a, 35b are slidably received within the central mounting member 32a and are connected at a forward end thereof to the forward mounting member 32b. The aft end of each of the slide tubes 35a, 35b is in turn connected to the aft mounting member 32c. The aft mounting member 32c carries a transverse aft support tube 36 having respective aft mounting plates 36a at each terminal end thereof. The forward and aft mounting plates 34a and 36a are in turn fixed to the lateral side plates 42a, 42b of the seat bucket frame 40. In such a manner therefore, the forward and aft mounting members 32b, 32c are capable of being moved rectilinearly relative to the central mounting member 32a so as to in turn allow the seat bucket frame 40 attached to each of the forward and aft support tubes 34, 36, respectively, to be moved in reciprocal rectilinear forward and aft directions (arrow A2 in FIG. 5).

Figure 6:
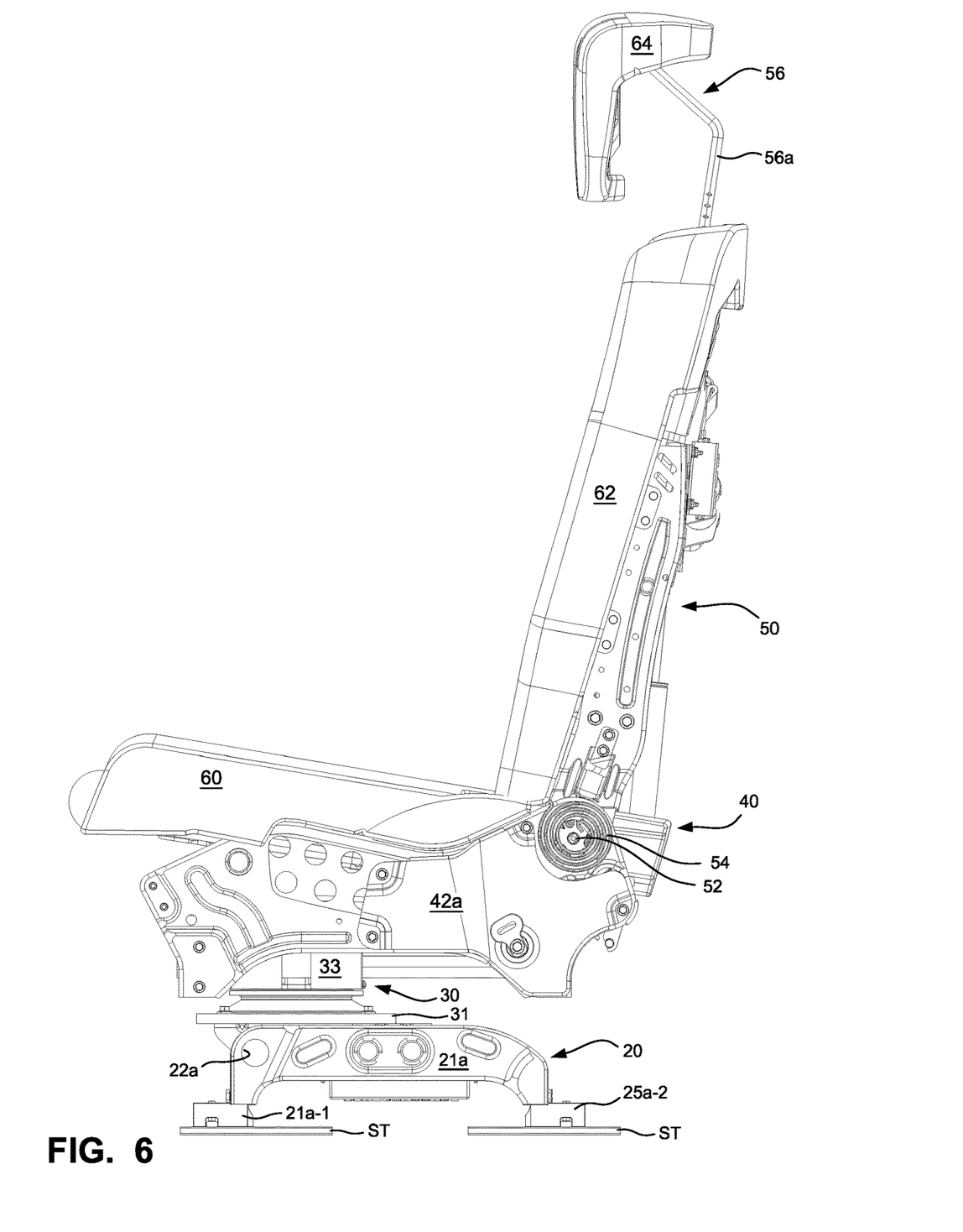
FIG. 6 is a side elevational view of the aircraft seat system according to FIG. 1 with the seat back in an upright position relative to the seat bucket.
Figure 7:
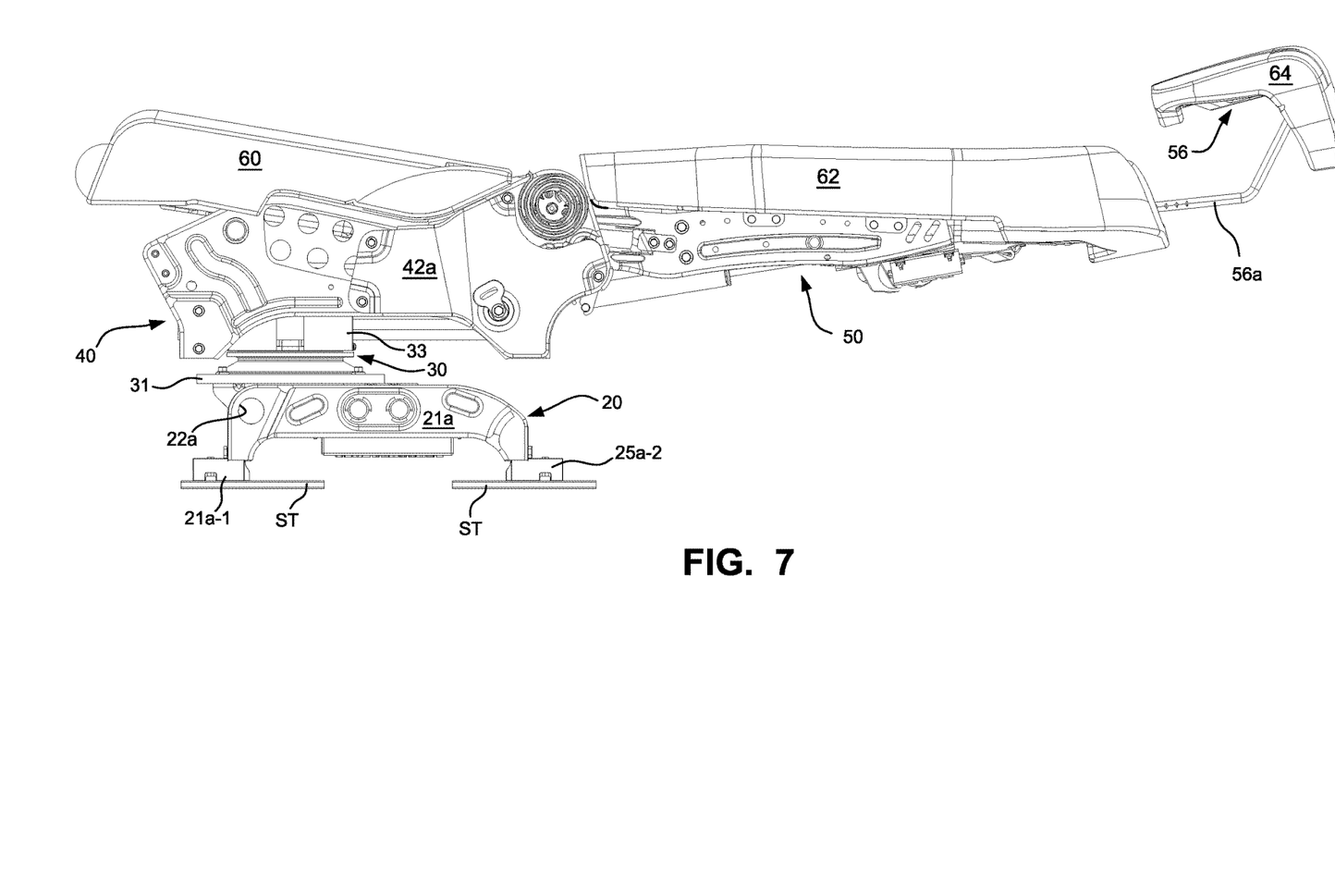
FIG. 7 is a side elevational view of the aircraft seat system according to FIG. 1 with the seat back in a fully reclined position relative to the seat bucket.

The seat bucket frame 40 includes lateral side plates 42a, 42b, A seat pan 44 spans the distance between and is fixed to each of the lateral side plates 42a, 42b. As noted previously, the seat bucket frame 40 and seat back frame 50 are connected to one another for relative articulated movement between an upright position wherein the seat back frame 50 is essentially positioned at substantially a right angle (e.g., about) 90°±15° relative to the seat bucket frame 40 as shown in FIG. 6 and a fully reclined position wherein the seat back frame 50 is essentially parallel (e.g., about) 180°±15° relative to the seat bucket frame 40 as shown in FIG. 7. Movement into the fully reclined position shown in FIG. 7 is achieved by the seat occupant manipulating an adjustment lever (not shown) attached to the adjustment mechanism 52 at the articulated junction between the seat bucket frame 40 and the seat back frame 50 while the latter is in the upright position shown in FIG. 6 and then lowering the seat back frame 50 against the spring force of the torsion spring 54 as assisted by the weight of the seat occupant. In order to return to the fully upright position, the seat occupant will again manipulate the adjustment lever (not shown) to allow the torsion spring 54 to unload its spring force thereby providing spring-assisted raising of the seat back frame 50 into the upright position as shown in FIG. 2. Back support straps 55a span the distance between the legs of an inverted U-shaped tubular frame member 55.

The seat back frame includes an integrated headrest frame 56 that may be positionally moved upwardly and downwardly by virtue of the headrest posts 56a cooperating with a detent positioning mechanism 56b. Each of the seat bucket frame 40, the seat back frame 50 and the head rest frame 56 is provided with a molded seat cushion 60, a molded back cushion 62 and a molded headrest cushion 64, respectively.

While reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. An aircraft seat system comprising:
   a seat base assembly,
   a seat tracking/swivel assembly fixed to the seat base assembly, and
   a seat bucket frame fixed to the seat tracking/swivel assembly, wherein
   the seat base assembly comprises:
   a pair of lateral support frames,
   a forward cross-support tube and a pair of aft cross-support tubes each being interconnected to the lateral support frames, and
   forward and aft pairs of laterally separated mounting brackets, wherein the forward pair of laterally separated mounting brackets is fixed to the forward cross-support tube, and the aft pair of laterally separated mounting brackets is connected to each one of the pair of aft cross-support tubes.

2. The aircraft seat system according to claim 1, wherein forward and aft ends of each of the lateral support frames include respective downwardly directed forward and aft mounting feet each adapted to being connected to an underlying seat track associated with a floor of an aircraft.

3. The aircraft seat system according to claim 1, wherein the seat tracking/swivel assembly comprises:
  a swivel base member adapted to being immovably fixed to the laterally spaced apart forward and aft mounting brackets of the seat base, and
  a central mounting member that includes a swivel connection block to interconnect the central mounting member to the swivel base member to allow rotational movement of the central mounting member about a substantially vertical axis relative to the immovably swivel base member.

4. The aircraft seat system according to claim 3, wherein the seat tracking/swivel assembly comprises:
  forward and aft mounting members positioned forward and aft of the central mounting member, and
  a laterally spaced apart pair of slide tubes slidably received within the central mounting member and connected at forward and aft ends thereof to the forward and aft mounting members.

5. The aircraft seat system according to claim 4, wherein the seat bucket frame includes a pair of spaced apart lateral side plates, and wherein
  the forward and aft mounting members of the seat tracking/swivel assembly carry respective transverse forward and aft mounting tubes each having opposed terminal ends which include a mounting plates that is fixed to a respective one of the lateral side plates of the seat bucket frame.

6. The aircraft seat system according to claim 3, further comprising a seat back frame connected at a lower end thereof to a rear end of the seat bucket frame to allow for articulated movement of the seat back frame relative to the seat bucket frame between upright and reclined positions.

7. The aircraft seat system according to claim 6, wherein the seat back frame comprises an inverted U-shaped tubular frame member having a pair of separated legs and back support straps spanning a distance between and connected to the separated legs.

8. The aircraft seat system according to claim 7, wherein an upper end of the seat back frame includes an integrated headrest frame.

9. The aircraft seat system according to claim 8, wherein the seat back frame includes detent positioning mechanisms, and wherein the headrest frame includes a pair of dependently oriented headrest posts cooperatively engaged with the detent positioning mechanisms to allow positional upward and downward movement of the headrest frame relative to the upper end of the seat back frame.

10. The aircraft seat system according to claim 9, wherein each of the seat bucket frame, the seat back frame and the head rest frame is provided with a molded seat cushion, a molded back cushion and a molded headrest cushion, respectively.

11. An aircraft which comprises at least one aircraft seat system according to claim 1.

12. An aircraft seat system comprising:
  a seat base assembly,
  a seat tracking/swivel assembly fixed to the seat base assembly, and
  a seat bucket frame which includes a pair of spaced apart lateral side plates fixed to the seat tracking/swivel assembly, wherein
  (i) the seat base assembly comprises:
    a pair of lateral support frames,
    a forward cross-support tube and a pair of aft cross-support tubes each being interconnected to the lateral support frames,
    forward and aft pairs of laterally separated mounting brackets, wherein the forward pair of laterally separated mounting brackets is fixed to the forward cross-support tube, and the aft pair of laterally separated mounting brackets is connected to each one of the pair of aft cross-support tubes, and wherein
  (ii) the seat tracking/swivel assembly comprises:
    a swivel base member adapted to being immovably fixed to the laterally spaced apart forward and aft mounting brackets of the seat base,
    a central mounting member that includes a swivel connection block to interconnect the central mounting member to the swivel base member to allow rotational movement of the central mounting member about a substantially vertical axis relative to the immovably swivel base member,
    forward and aft mounting members positioned forward and aft of the central mounting member,
    transverse forward and aft mounting tubes respectively carried by the forward and aft mounting members, each of the forward and aft mounting tubes having opposed terminal ends which include mounting plates that are fixed to a respective one of the lateral side plates of the seat bucket frame, and
    a laterally spaced apart pair of slide tubes slidably received within the central mounting member and connected at forward and aft ends thereof to the forward and aft mounting members.

13. An aircraft which comprises at least one aircraft seat system according to claim 12.

* * * * *